United States Patent [19]
Mueller et al.

[11] Patent Number: 5,134,701
[45] Date of Patent: Jul. 28, 1992

[54] TEST APPARATUS PERFORMING RUNTIME REPLACEMENT OF PROGRAM INSTRUCTIONS WITH BREAKPOINT INSTRUCTIONS FOR PROCESSOR HAVING MULTIPLE INSTRUCTION FETCH CAPABILITIES

[75] Inventors: David C. Mueller; Steven R. Williams; Nabil M. Abu-Jbara, all of Colorado Springs, Colo.

[73] Assignee: Hewlett-Packard Co., Palo Alto, Calif.

[21] Appl. No.: 310,153

[22] Filed: Feb. 10, 1989

[51] Int. Cl.$^5$ .............................. G06F 11/30
[52] U.S. Cl. .................... 395/500; 364/264; 364/264.4; 364/267.2; 364/267; 364/DIG. 2; 371/19
[58] Field of Search ... 364/200 MS File, 900 MS File, 364/DIG. 2; 371/19; 395/500, 775, 725, 375

[56] References Cited

U.S. PATENT DOCUMENTS

| | | | |
|---|---|---|---|
| 3,509,541 | 4/1970 | Gordon | 364/200 |
| 3,904,860 | 9/1975 | Huber | 364/200 |
| 4,080,650 | 3/1978 | Beckett | 364/200 |
| 4,126,893 | 11/1978 | Cronshaw . | |
| 4,176,394 | 11/1979 | Kaminski | 364/200 |
| 4,241,416 | 12/1980 | Tarcty-Hornoch | 364/900 |
| 4,429,368 | 1/1984 | Kurii | 364/200 |
| 4,495,563 | 1/1985 | McDonough | 364/200 |
| 4,511,960 | 4/1985 | Boudreau | 364/200 |
| 4,511,961 | 4/1985 | Penton | 364/200 |
| 4,571,677 | 2/1986 | Hirayama | 364/200 |
| 4,635,193 | 1/1987 | Moyer | 364/200 |
| 4,740,895 | 4/1988 | Sargent | 364/200 |
| 4,782,461 | 11/1988 | Mick | 364/900 |
| 4,811,345 | 3/1989 | Johnson | 364/200 |
| 4,819,234 | 4/1989 | Huber | 364/200 |
| 4,910,663 | 3/1990 | Bailey | 364/200 |

OTHER PUBLICATIONS

"Custom Trigger Chip Speeds 32-Bit Emulator To 33 MHz and Beyond"; Novellino; Electronic Design; Jan. 26, 1989; pp. 77 and 78.

Primary Examiner—Thomas C. Lee
Assistant Examiner—Eric Coleman

[57] ABSTRACT

The test apparatus for monitoring the operation of a processor that has multiple instruction fetch capability monitors the instruction memory to record the sequence of program instructions that are retrieved by the processor from program memory. The test apparatus determines when a jump operation is executed and determines the target of the jump oepration by inserting a break point instruction in place of one of the two program instructions that is retrieved by the processor from program memory. This instruction substitution is accomplished by an instruction jamming circuit that forces the break point instruction onto the processor data bus as part of the program instruction fetch cycle in lieu of one of the instruction retrieved as part of the execution of the jump instruction. If the break point operation is executed, then the target address of the jump operation is the address location that contains the break point instruction that was substituted for one of the program instructions retrieved from the instruction memory. In this case, the test apparatus responds to the execution of the break point instruction by replacing the program instruction originally retrieved from program memory and substituted for by the break point instruction. Thus, the break point instruction acts as a flag to indicate that this address is the target address of the jump instruction. If the break point instruction is not executed by the processor, it is because the jump instruction target address is the location that contains the other retrieved program instruction.

33 Claims, 2 Drawing Sheets

TEST APPARATUS PERFORMING RUNTIME REPLACEMENT OF PROGRAM INSTRUCTIONS WITH BREAKPOINT INSTRUCTIONS FOR PROCESSOR HAVING MULTIPLE INSTRUCTION FETCH CAPABILITIES

FIELD OF THE INVENTION

This invention relates to test apparatus for monitoring the operation of a processor, and in particular, apparatus for tracing the step-by-step program execution of a processor that has the capability to retrieve a plurality of program instructions in a single instruction fetch.

PROBLEM

It is a problem in the field of test apparatus to monitor the step-by-step program execution of a processor that retrieves more than a single program instruction during the processor's instruction fetch cycle. Many thirty-two (32) bit processors use a thirty-two (32) bit wide data bus to retrieve two sixteen (16) bit instructions during each instruction fetch cycle of the processor. This operation improves the efficiency of the thirty-two (32) bit processor since the program instructions are primarily executed in sequential order by the processor and only one-half as many program instruction fetch cycles are required. In such an arrangement, it is difficult to exactly trace the sequence of program instructions that are executed by some processors when a jump type of operation is encountered in the sequence of program instructions. When a jump operation takes place, the processor flushes any remaining program instructions from the instruction buffer and begins to fetch program instructions from a different address. The first program instruction fetch at this different address may be designed to always obtain 32 bits of instructions even if only the second 16 bits are needed. The test equipment cannot determine which of the two retrieved instructions is the target of the jump operation. Thus, in a processor that retrieves a plurality of program instructions during each instruction fetch cycle, the presently available test apparatus cannot distinguish which instructions are actually executed by the processor and which instructions were temporarily stored in the instruction buffer and not used immediately after the execution of a jump instruction.

SOLUTION

The above described problems are solved and a technical advance achieved in the field by a test apparatus for monitoring the operation of a processor that has multiple instruction fetch capability. This test apparatus monitors the instruction fetches from program memory. The test apparatus detects when the processor executes a jump operation and determines the target address of the jump operation by inserting a break point instruction in place of one of the program instructions that are retrieved by the processor from program memory. This instruction substitution is accomplished by an instruction jamming circuit that forces the break point instruction onto the processor data bus as part of the program instruction fetch cycle in lieu of one of the instructions retrieved as part of the instruction fetch after the execution of the jump instruction. If the break point operation is executed, then the target address of the jump operation is the address location that contains the breakpoint instruction that was substituted for one of the program instructions retrieved from the instruction memory. In this case, the test apparatus responds to the execution of the break point instruction by replacing the program instruction originally retrieved from program memory and substituted for by the break point instruction. Thus, the break point instruction acts as a flag to indicate, when executed, that this address is the target address of the jump instruction. If the break point instruction is not executed by the processor, it is because the jump instruction target address is the location that contains the other retrieved program instruction. Thus, the execution or non-execution of the break point instruction acts as a flag to indicate to the test apparatus which of the retrieved program instructions that the processor has fetched as a result of the jump instruction was actually executed. In this manner, the test apparatus provides an accurate record of the sequence of program instructions that are actually executed by the processor under test.

BRIEF DESCRIPTION OF THE DRAWING

FIG. 4 illustrates further details of the interconnection of the test apparatus and the system under test.

DETAILED DESCRIPTION OF THE DRAWING

It is a problem in the field of test apparatus to monitor the step-by-step program execution of a processor that retrieves more than a single instruction during each processor instruction fetch cycle. Many processors use a thirty-two (32) bit wide data bus to retrieve two sixteen (16) bit instructions during each instruction fetch cycle of the processor. This operation improves the efficiency of the processor since the program instructions are primarily executed in sequential order by the processor and only one half as many program instruction fetch cycles are required. In such an arrangement, it is difficult to exactly trace the sequence of program instructions that are executed by some processors when a jump type of operation is encountered in the sequence of program instructions. When a jump operation takes place, the processor flushes any remaining program instructions from the instruction buffer and begins to fetch program instructions from a different address. The first program instruction fetch at this different address may be designed to always obtain 32 bits of instructions even if only the second 16 bits are needed. The test equipment cannot determine which of the two retrieved instructions is the target of the jump operation. Thus, in a processor that retrieves a plurality of program instructions during each instruction fetch cycle, the presently available test apparatus cannot distinguish which instructions are actually executed by the processor and which instructions were temporarily fetched but not used immediately after the execution of a jump instruction.

Test Apparatus Architecture

Figure 1:
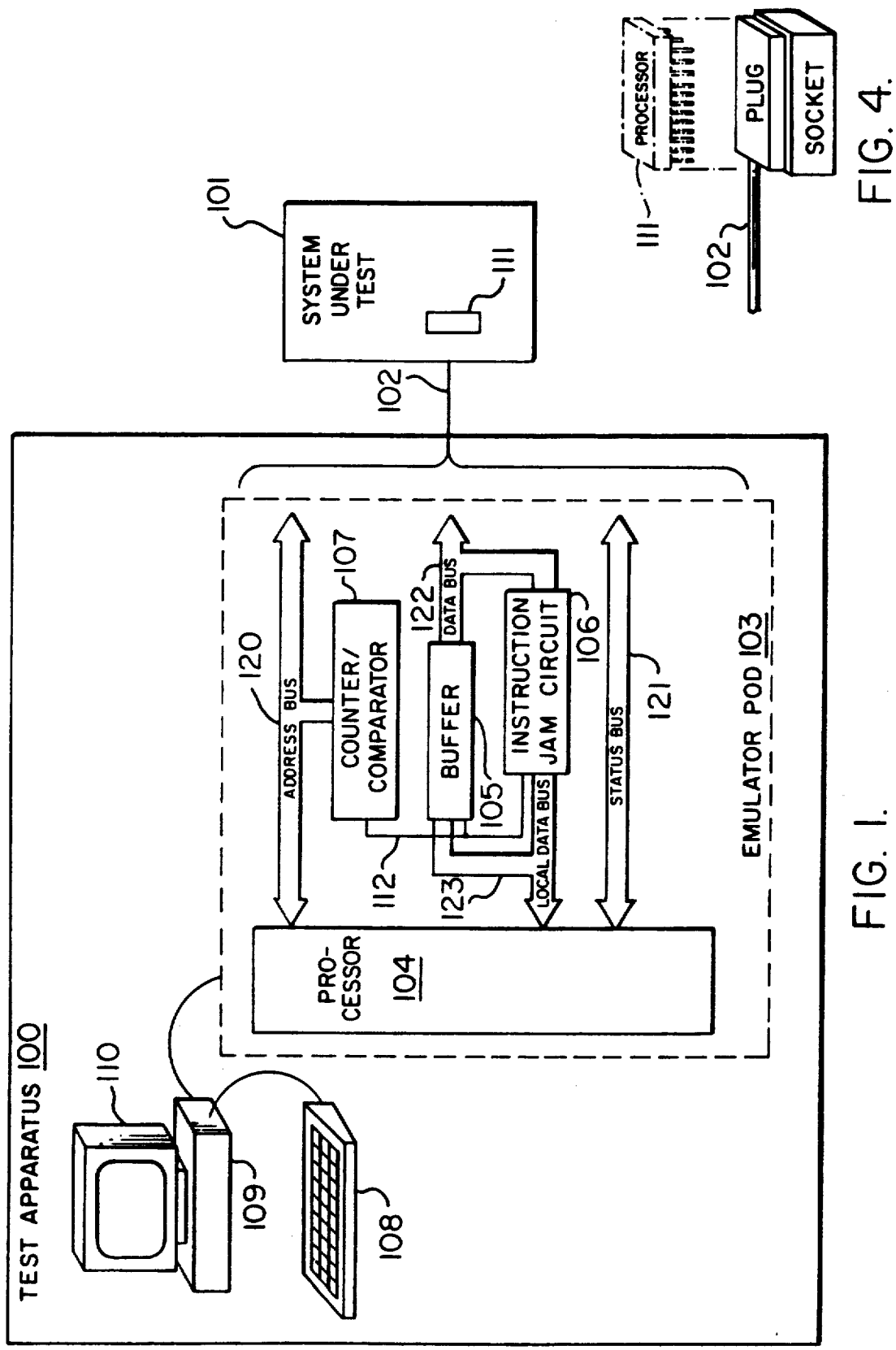
FIG. 1 illustrates, in block diagram form, the test apparatus for monitoring the operation of a processor that has the capability of retrieving a plurality of program instructions.

FIG. 1 illustrates in block diagram form the test apparatus for monitoring the operation of a processor that can retrieve a plurality of program instructions during each instruction fetch cycle and the interconnection of this test apparatus with a system under test. The test apparatus 100 is interconnected with a processor controlled system under test 101 via a set of cables 102. The interconnection of the test apparatus 100 and the system under test 101 is such that the processor status (121), address (120) and data busses (122) in the system under test 101 are interconnected with the test apparatus 100. This interconnection enables test apparatus 100 to monitor the exact operation of the system under test 101.

Test apparatus 100 typically includes a host such as a computer 109 that is equipped with a keyboard 108 and a video monitor 110. The function of computer 109 and the additional circuitry (not shown) found in test apparatus 100 is to record the sequence of program instruction operations executed by the processor 111 in system under test 101. The function of this additional circuitry in test apparatus 100, as well as the software in computer 109, is well known and is not disclosed in detail herein. Computer 109 can be for example a Hewlett Packard Model 9000, Series 300 computer and the additional test apparatus is included in for example a Hewlett Packard 64120 instrumentation package.

The recording and analysis circuitry and software of test apparatus 100 typically cannot exactly follow the instruction flow of the processor 111 in system under test 101 since the program flow can become nonsequential whenever a jump, branch, interrupt or other similar operation is executed by the processor 111. In these situations, the processor 111 may fetch multiple instructions from a new address, called the target address, rather than following the sequence of operations that were originally retrieved from program memory. While it is possible to either replicate or simulate the internal operation of the processor 111 in system under test 101 and thereby uncover which instructions were and were not executed, this requires extensive human intervention and is expensive and subject to error. Emulator pod 103 functions to indirectly force the processor 111 in system under test 101 to reveal which instructions were not executed. This is accomplished without the execution of a software monitor or the need to execute a dump operation which significantly impacts on the real time operation of the system under test 101.

The interconnection illustrated in FIG. 4 represents the emulation of the operation of the processor 111 in the system under test 101. In this application, the processor 111 normally found in the system under test 101 is replaced by the emulator pod 103 which functions in the same manner as the processor 111 removed from the system under test 101. Cable 102 plugs into the connector in which the processor 111 in system under test 101 is normally installed. Cable 102 brings the address 120, status 121 and data 122 busses from system under test 101 to a processor 104 in emulator pod 103 as illustrated in FIG. 1. Processor 104 is either the same device as processor 111 or is a device that can emulate the operation of processor 111 so that processor 104 executes the program instructions in system under test 101 in transparent fashion. The processor address 120 and status 121 busses of system under test 101 are connected directly to processor 104. The processor data bus 122 of system under test 101 is connected to processor 104 by way of buffer 105, the function of which is described below. Thus, emulator pod 103 functions as processor 111.

Program Branch Example

An example of a processor that retrieves a plurality of instructions on every instruction fetch cycle is the Motorola Incorporated MC68020 Microprocessor. This device has an instruction repertoire based on sixteen bit words. However, to improve the performance of this microprocessor, the MC68020 fetches two words totalling thirty-two bits of information on every instruction fetch cycle thereby improving the throughput of the data bus. An example of this is when a jump operation such as "JMP (A0)" instruction occurs, thirty-two bits of instruction are fetched from the designated address. This operation entails a jump to the target address contained in the processor's internal register (A0). Since register A0 is an internal register in the processor, it is impossible to determine the value of the address contained in this register without duplicating the internal arithmetic and logic of the processor. Thus, it is impossible to determine which of the two words retrieved by the processor represents the target address and which of the two words retrieved by the processor represents an instruction that is not executed by the processor.

In order to resolve this problem, the emulator pod circuitry 103 illustrated on FIG. 1 indicates in indirect fashion which of the two words is executed by the processor in the sequence of program instructions. This is accomplished by the use of buffer 105 and instruction jam circuit 106 and counter/comparator 107 shown on FIG. 1. Counter/comparator 107 monitors the sequencing of program instructions as determined by the addresses that appear on the address bus 120 from processor 104. Whenever counter/comparator 107 detects an address on the address bus 120 that does not represent the next numerical address in the sequence of program instructions that are executed by processor 104, this indicates that processor 104 is fetching from an out of sequence address.

In the case of the MC68020 processor, either the upper sixteen bits or the lower sixteen bits of the thirty-two bit word that is retrieved is the instruction that processor 104 will continue execution with. Unless the sequence of program instructions are extensively analyzed, it is impossible to determine which of the two sixteen bit words are executed by processor 104 in this situation. In order to determine which of these two words are executed by processor 104, counter/comparator 107 in response to the out of sequence address appearing on the address bus 120, simultaneously activates buffer 105 and instruction jam circuit 106 via lead 112. Buffer 105 captures one of the two sixteen bit words that appears on the data bus 122 of system under test 101 in response to the address output by processor 104 on the address bus 120 of system under test 101. Concurrently, the instruction jam circuit 106 outputs a predetermined instruction on the local data bus 123 in place of the instruction that was captured from the data bus 122 of system under test 101. Thus, an example would be the capture of the lower sixteen bits of the thirty-two bit word in buffer 105 and the substitution of a break point (BKPT) instruction in its place on the data bus 123 by instruction jam circuit 106. If the lower sixteen bit word was the target of the jump operation that caused the out of sequence address to appear on the address bus 120, then a break point acknowledge cycle is executed by processor 104, thereby indicating that the lower sixteen bit word was the instruction executed in response to the jump operation. If this is the case, counter/comparator 107 activates buffer 105 to output the originally retrieved instruction that was captured as described above. Processor 104 then continues its operation and the sequence of program instructions executed by processor 104 is thereby determined.

If the upper sixteen bits of the thirty-two bit word were the target of the jump instruction, then the break point acknowledge cycle does not occur and test apparatus 100 can thereby determine that the upper sixteen bit word was the target of the jump operation. Thus, this apparatus can accurately identify which of the two sixteen bit words retrieved by processor 104 is the target of the jump operation with only the overhead of executing a break point instruction.

In the above example, a break point instruction was used to illustrate the operation of this invention although other similar instructions could be used in its place. The requirement is that the predetermined instructions require only a minimum amount of program execution time and do not affect that actual operation of processor 104 by corrupting data or impacting the code in the program that is being executed. This arrangement permits real time tracking of program flow with only a minimum of overhead since the predetermined instruction causes only minimal impact in the operation of processor 104. Examples of other predetermined instructions that can be substituted for a break point operation is a trap instruction that forces the processor into a monitor program that consists of only one more instruction. This requires a slightly more significant intrusion into the program flow than a break point instruction but is a viable alternative when real time operation of system under test 101 is not of prime importance.

Test System Flow Diagram

Figures 2, 3:
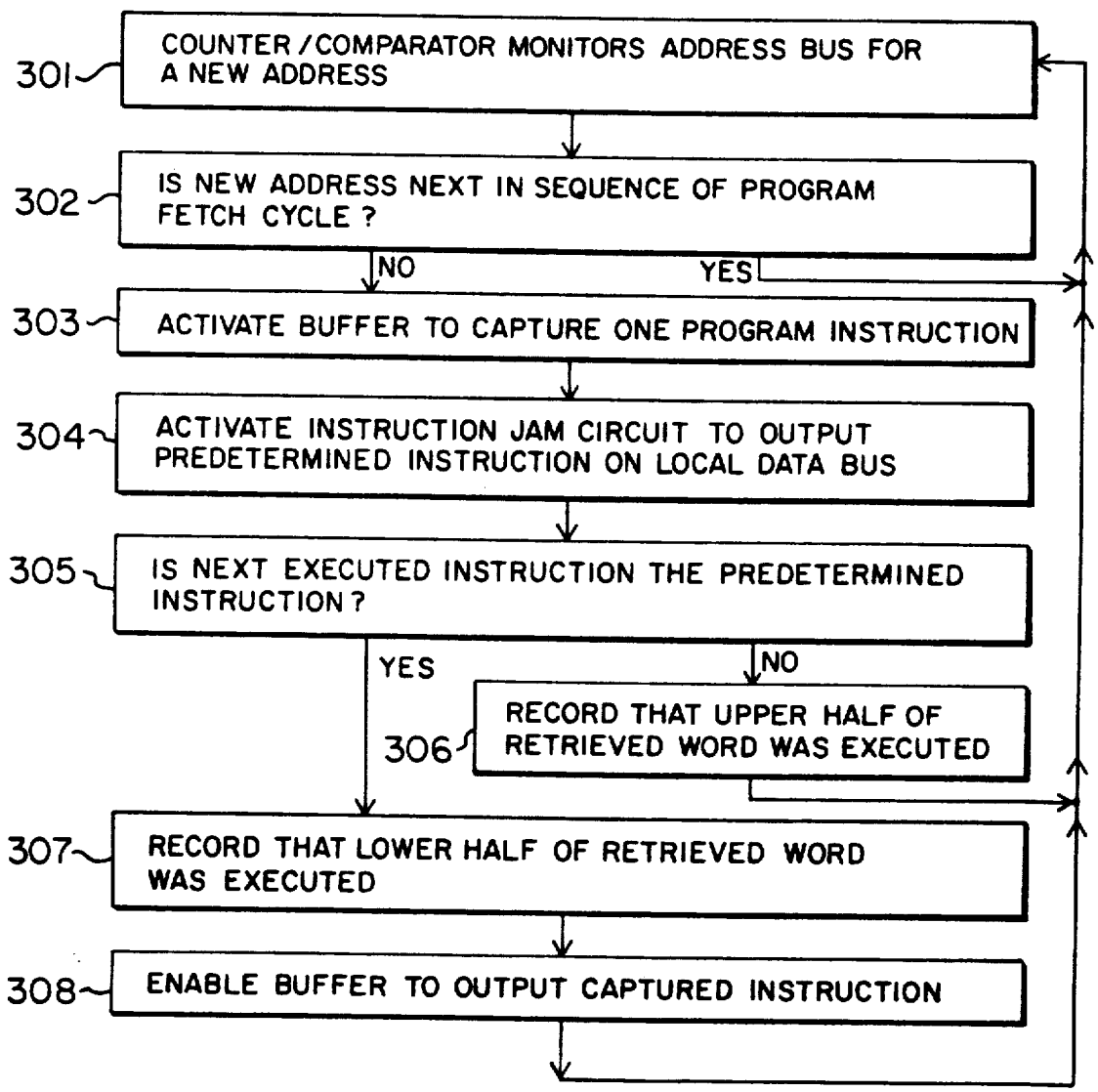
FIG. 2 illustrates, in memory map form, the instruction memory and the contents thereof.
FIG. 3 illustrates, in flow diagram form, the operation of the test apparatus for monitoring the operation of a processor that has the capability of retrieving a plurality of program instructions.

In order to further illustrate the operation of this system, FIGS. 2 and 3 illustrate respectively the instruction memory and the contents thereof, and a flow diagram of the operation of this apparatus respectively. FIG. 2 illustrates the sequence of program instructions that are retrieved by processor 104 from program memory. The first two instructions illustrated in FIG. 2 represent the last retrieved instructions in what can be a long sequence of instructions executed by processor 104. Instructions are labeled on the lefthand side by their addresses. In this case, the addresses are arbitrarily selected for the purpose of illustration to be 1000 and 1002 respectively. These two sequential addresses are read by processor 104 in a single program instruction fetch cycle to thereby retrieve two sixteen bit words from memory. In the example illustrated in FIG. 2, these instructions are NOP and JMP (A0) respectively. Processor 104, in executing the sequence of instructions retrieved from program memory, first executes the instruction at address 1000. Processor 104 on completion of this operation advances to the instruction that was retrieved from address 1002 and executes the JMP (A0) instruction. This program instruction causes the processor 104 to retrieve the instruction that is stored at the address indicated by the variable A0. A0 in the case of the Motorola MC68020 processor represents an internal register in the processor 104.

In flow diagram form on FIG. 3 is illustrated the operation of the apparatus shown in FIG. 1. At step 301, counter/comparator 107 monitors the address bus 120 for each new address that is output by processor 104. At step 302, counter/comparator 107 determines whether this address is the next address in the sequence of retrieved program instructions. In the case of the addresses 1000 and 1002 illustrated in FIG. 2 these addresses are assumed to be part of a sequence of program instructions that follow in numerical order. Therefore, counter/comparator 107 determines that these retrieved instructions are next in the sequential order of addresses accessed by processor 104 and returns to step 301 to monitor the next address that appears on the address bus 120. When processor 104 executes the instruction retrieved from address 1002, the sequence of program instructions is interrupted since processor 104 is required to jump to the address location indicated by register A0. For the purpose of illustration, the value A0 is selected to be 2000. Thus, processor 104 outputs 2000 on the address bus 120 and at step 301, counter/comparator 107 responds to the appearance of a new address on the address bus 120 by comparing this address at step 302 with the previously recorded address that appeared on the address bus 120. Since this address (2000) presently extant on the address bus 120 is not the next address in the sequence of addresses, processing advances to step 303 where counter/comparator 107 activates buffer 105 to capture one word of the two words that are retrieved by processor 104 from the program memory.

In FIG. 2 instruction 2000 is illustrated as a "MOVE D0, D1" instruction while the next instruction at address 2002 is a "MOVE D1, D2" instruction. Since the processor 104 retrieves both of these instructions in a single instruction fetch cycle it is not obvious which one of these two addresses is the target of the jump operation that was executed at the previous step. Therefore, at step 303, buffer circuit 105 captures one of the two instructions that are retrieved by processor 104 from memory. For the purpose of illustration, the instruction at address 2000 representing the lower half of the two words retrieved from memory is stored in buffer 105. At step 304, counter/comparator 107 activates instruction jam circuit 106 to output a predetermined instruction onto the data bus in place of instruction that is stored at memory location 2000 in the program memory. For the purpose of illustration, a break point instruction (BKPT n) is output on the local data bus 123 in place of the program instruction that was stored in memory location 2000. At step 305, the emulator pod circuit 103 determines whether the next instruction executed by processor 104 is the predetermined instruction that was output on the local data bus 123 in place of the captured instruction that appeared in the lower half of the thirty-two bit word that was retrieved by processor 104. In the case where this instruction is not the predetermined instruction, processing advances to step 306 where the computer 110 records that the upper half of the retrieved word is the instruction that was executed by processor 104 during this processing cycle. Processing then returns to step 301 where counter/comparator circuit 107 continues to monitor the address bus 120 as described above.

If, at step 305, the next instruction executed by processor 104 was the predetermined instruction jammed onto the local data bus 123 in place of the captured word that was retrieved from the program memory, then at step 307 computer 110 records the captured instruction as the next instruction in the sequence of program instructions executed by processor 104. In the MC68020 processor, execution of the BKPT n instruction is a unique operation and easily detected. At step 308, buffer 105 outputs the captured instruction that appeared at address location 2000 on the local data bus 123 to enable processor 104 to execute this instruction as part of the normal cycle of its operation. In this fashion, the use of a buffer 105, counter/comparator circuit 107 and instruction jam circuit 106 enables test apparatus 100 to exactly determine the sequence of program instructions that are executed by processor 104 while following through a predetermined program. The operation of processor 104 is only minimally impacted in its real time performance by the use of this test apparatus since the only deviation from the normal flow of program instruction execution is the occasional insertion of a break point operation to indirectly flag which of the two retrieved program instructions are executed by processor 104 in response to a jump operation.

While a specific embodiment of the invention has been disclosed it is expected that those skilled in the art can and will devise alternate embodiments that fall within the scope of the appended claims.

We claim:

1. In a test system that monitors the operation of a system under test, which system under test includes a processor that retrieves a plurality of program instructions from a program memory during a program instruction fetch cycle for immediate execution of said retrieved program instructions by said processor, wherein each program instruction is stored in a designated location in said program memory, each said designated location having a memory address, a program instruction trace apparatus for determining a sequence of program instructions executed by said processor comprising:

means, responsive to said processor retrieving a plurality of program instructions from said program memory for immediate execution of the retrieved program instructions by said processor, for comparing the memory address of each of said plurality of program instructions retrieved by said processor during a presently executing program instruction fetch cycle with the memory address of the last previously retrieved program instruction to determine whether said presently retrieved program instructions represent an out of sequence program instruction fetch;

means, responsive to said comparing means, for substituting a predefined program instruction for one of said presently retrieved program instructions when said presently retrieved program instructions represent an out of sequence program instruction fetch; means for storing said one presently retrieved program instruction; and means, responsive to said processor executing said predefined program instruction, for replacing said executed predefined program instruction with said one retrieved program instruction.

2. The apparatus of claim 1 wherein said predefined program instruction comprises:
   a breakpoint instruction.

3. The apparatus of claim 1 further including:
   means for recording said retrieved program instructions.

4. The apparatus of claim 3 further including:
   means for deleting one or more of said recorded program instructions in said plurality of program instructions retrieved in said one program instruction fetch cycle when said processor fails to execute said predefined program instruction.

5. The apparatus of claim 1 wherein said substituting means includes:
   means interposed between said processor and said program memory for transmitting said predefined program instruction to said processor in lieu of said one retrieved program instruction.

6. The apparatus of claim 5 wherein said substituting means further includes:
   buffer means for storing said one retrieved program instruction.

7. The apparatus of claim 6 wherein said replacing means includes:
   means responsive to the execution of said predefined program instruction for reading said intercepted retrieved program instruction from said buffer means to said processor.

8. In a test system that monitors the operation of a system under test, which system under test includes a processor that retrieves a plurality of program instructions from a program memory during a program instruction fetch cycle, wherein each program instruction is stored in a designated location in said program memory, each said designated location having a memory address, a program instruction trace apparatus for determining a sequence of program instructions executed by said processor comprising:

means for comparing the memory address of each of said plurality of program instructions retrieved by said processor during a presently executing program instruction fetch cycle with the memory address of the last previously retrieved program instruction to determine whether said presently retrieved program instructions represent an out of sequence program instruction fetch;

means, responsive to said comparing means, for substituting a predefined program instruction for one of said presently retrieved program instructions when said presently retrieved program instructions represent an out of sequence program instruction fetch;

means, responsive to said processor executing said predefined program instruction, for replacing said executed predefined program instruction with said one retrieved program instruction;

means for recording said retrieved program instructions; and means for deleting one or more of said recorded program instructions in said plurality of program instructions retrieved in said one program instruction fetch cycle when said processor fails to execute said predefined program instruction.

9. The apparatus of claim 8, wherein said predefined program instruction comprises:
   a breakpoint instruction.

10. The apparatus of claim 8 wherein said substituting means includes:
    means interposed between said processor and said program memory for transmitting said predefined program instruction to said processor in lieu of said one retrieved program instruction.

11. The apparatus of claim 10 wherein said substituting means further includes:
    buffer means for storing said one retrieved program instruction.

12. The apparatus of claim 11 wherein said replacing means includes:
    means responsive to the execution of said predefined program instruction for reading said intercepted retrieved program instruction from said buffer means to said processor.

13. In a test system that monitors the operation of a system under test, which system under test includes a processor that retrieves a plurality of program instructions from a program memory during a program instruction fetch cycle for immediate execution of said retrieved program instructions by said processor, wherein each program instruction is stored in a designated location in said program memory, said designated location having a memory address, a method of determining a sequence of program instructions executed by said processor comprising the computer implemented steps of:

comparing, in response to said processor retrieving a plurality of program instructions from said program memory for immediate execution of the retrieved program instructions by said processor, the memory address of each of said plurality of program instructions retrieved by said processor during a presently executing program instruction fetch cycle with the memory addresses of the last previously retrieved program instructions to determine whether said presently retrieved program instructions represent an out of sequence program instruction fetch;

substituting a predefined program instruction for one of said presently retrieved program instructions when said presently retrieved program instructions represent an out of sequence program instruction fetch; storing said one presently retrieved program instruction; and replacing, in response to said processor executing said predefined program instruction, said executed predefined program instruction with said one retrieved program instruction.

14. The method of claim 13 wherein said step of substituting includes the step of transmitting said predefined program instruction to said processor in lieu of said one retrieved program instruction.

15. The method of claim 14 wherein said step of substituting further includes the step of:

intercepting said one retrieved program instruction.

16. The method of claim 15 wherein said step of replacing includes the step of:

reading said intercepted retrieved program instruction to said processor in response to said processor executing said predefined program instruction.

17. The method of claim 13 further including the step of:

recording said retrieved program instructions.

18. The method of claim 17 further including the step of:

deleting said recorded program instructions in said plurality of program instructions retrieved in said one program instruction fetch cycle when said processor fails to execute said predefined program instruction.

19. In a test system that monitors the operation of a system under test, which system under test includes a processor that retrieves a plurality of program instructions from a program memory during a program instruction fetch cycle, wherein each program instruction is stored in a designated location in said program memory, said designated location having a memory address, a method of determining a sequence of program instructions executed by said processor comprising the computer implemented steps of:

comparing the memory address of each of said plurality of program instructions retrieved by said processor during a presently executing program instruction fetch cycle with the memory addresses of the last previously retrieved program instructions to determine whether said presently retrieved program instructions represent an out of sequence program instruction fetch;

substituting a predefined program instruction for one of said presently retrieved program instructions when said presently retrieved program instructions represent an out of sequence program instruction fetch;

replacing, in response to said processor executing said predefined program instruction, said executed predefined program instruction with said one retrieved program instruction;

recording said retrieved program instructions; and deleting one or more of said recorded program instructions in said plurality of program instructions retrieved in said one program instruction fetch cycle when said processor fails to execute said predefined program instruction.

20. The method of claim 19 wherein said step of substituting includes the step of transmitting said predefined program instruction to said processor in lieu of said one retrieved program instruction.

21. The method of claim 20 wherein said step of substituting further includes the step of:

intercepting said one retrieved program instruction.

22. The method of claim 21 wherein said step of replacing includes the step of:

reading said intercepted retrieved program instruction to said processor in response to said processor executing said predefined program instruction.

23. In a test system that monitors the operation of a system under test, which system under test includes a processor that retrieves a plurality of program instructions from a program memory during each program instruction fetch cycle for immediate execution of said retrieved program instructions by said processor, wherein each program instruction is stored in a designated location in said program memory, said designated location having a memory address, a program instruction trace apparatus for determining a sequence of program instructions executed by said processor comprising:

means, responsive to said processor retrieving a plurality of program instructions from said program memory for immediate execution of the retrieved program instructions by said processor, for intercepting one of said plurality of program instructions retrieved by said processor during a program instruction fetch cycle in response to an out of sequence program instruction fetch;

means, responsive to said intercepting means, for substituting a predefined program instruction for said one intercepted program instruction; means for storing said one intercepted program instruction; and means, responsive to said processor executing said predefined program instruction, for replacing said executed predefined program instruction with said one intercepted program instruction.

24. The apparatus of claim 23 wherein said substituting means includes:
   means interposed between said processor and said program memory for transmitting said predefined program instruction to said processor in lieu of said one intercepted program instruction.

25. The apparatus of claim 24 wherein said substituting means further includes:
   buffer means for storing said one intercepted program instruction.

26. The apparatus of claim 25 wherein said replacing means includes:
   means responsive to said processor executing said predefined program instruction for reading said intercepted stored program instruction from said buffer means to said processor.

27. The apparatus of claim 23 further including:
   means for recording said retrieved program instructions.

28. The apparatus of claim 27 further including:
   means for deleting said recorded program instructions in said plurality of program instructions retrieved in said one program instruction fetch cycle when said processor fails to execute said predefined program instruction.

29. In a test system that monitors the operation of a system under test, which system under test includes a processor that retrieves a plurality of program instructions from a program memory during a program instruction fetch cycle, wherein each program instruction is stored in a designated location in said program memory, said designated location having a memory address, a program instruction trace apparatus for determining a sequence of program instructions executed by said processor comprising:
   means for comparing the memory address of each of said plurality of program instructions retrieved by said processor during a presently executing program instruction fetch cycle with the memory address of the last previously retrieved program instruction to determine whether said presently retrieved program instructions represent an out of sequence program instruction fetch;
   means, responsive to said comparing means, for substituting a predefined program instruction for one of said presently retrieved program instructions when said presently retrieved program instructions represent an out of sequence program instruction fetch, including:
      means, interposed between said processor and said program memory, for transmitting said predefined program instruction to said processor in lieu of said one retrieved program instruction,
      buffer means for intercepting said one retrieved program instruction,
      means, responsive to said processor executing said predefined program instruction, for replacing said one retrieved program instruction, including:
      means, responsive to said processor executing said predefined program instruction, for reading said intercepted retrieved program instruction from said buffer means to said processor; means for recording said retrieved program instructions;
   means for deleting said recorded program instructions in said plurality of program instructions retrieved in said one program instruction fetch cycle when said processor fails to execute said predefined program instruction.

30. In a test system that monitors the operation of a system under test, which system under test includes a processor that retrieves a plurality of program instructions from a program memory during each program instruction fetch cycle, wherein each program instruction is stored in a designated location in said program memory, said designated location having a memory address, a program instruction trace apparatus for determining a sequence of program instructions executed by said processor comprising:
   means for intercepting one of said plurality of program instructions retrieved by said processor during a program instruction fetch cycle in response to an out of sequence program instruction fetch;
   means, responsive to said intercepting means, for substituting a predefined program instruction for said one intercepted program instruction;
   means, responsive to said processor executing said predefined program instruction, for replacing said executed predefined program instruction with said one intercepted program instruction;
   means for recording said retrieving program instructions; and
   means for deleting one or more of said recorded program instructions in said plurality of program instructions retrieved in said one program instruction fetch cycle when said processor fails to execute said predefined program instruction.

31. The apparatus of claim 30 wherein said substituting means includes:
   means interposed between said processor and said program memory for transmitting said predefined program instruction to said processor in lieu of said one intercepted program instruction.

32. The apparatus of claim 31 wherein said substituting means further includes:
   buffer means for storing said one intercepted program instruction.

33. The apparatus of claim 32 wherein said replacing means includes:
   means responsive to said processor executing said predefined program instruction for reading said intercepted stored program instruction from said buffer means to said processor.

* * * * *